(12) United States Patent
Kobayashi et al.

(10) Patent No.: US 10,413,874 B2
(45) Date of Patent: Sep. 17, 2019

(54) EXHAUST GAS PURIFICATION DEVICE (71) Applicant: Yanmar Co., Ltd., Osaka-shi, Osaka-fu (JP)

(72) Inventors: Ryota Kobayashi, Osaka (JP); Tetsuya Yokoyama, Osaka (JP); Yoshinori Fukui, Osaka (JP); Keiichi Tsujimoto, Osaka (JP); Kenya Onishi, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 15/764,516

(22) PCT Filed: Jun. 17, 2016

(86) PCT No.: PCT/JP2016/068154
§ 371 (c)(1),
(2) Date: Mar. 29, 2018

(87) PCT Pub. No.: WO2017/056578
PCT Pub. Date: Apr. 6, 2017

(65) Prior Publication Data
US 2018/0264422 A1    Sep. 20, 2018

(30) Foreign Application Priority Data
Sep. 30, 2015   (JP) ................... 2015-195401

(51) Int. Cl.
*B01F 5/06*    (2006.01)
*F01N 3/08*    (2006.01)
(Continued)

(52) U.S. Cl.
CPC .......... *B01F 5/0614* (2013.01); *B01F 5/0616* (2013.01); *B01F 5/0618* (2013.01);
(Continued)

(58) Field of Classification Search
CPC .... B01F 5/0614; B01F 5/0616; B01F 5/0618; F01N 2240/20; F01N 2450/22;
(Continued)

(56) References Cited

U.S. PATENT DOCUMENTS

2009/0320453 A1    12/2009   Salanta et al.
2010/0071352 A1*   3/2010    Tatur .................. B01F 3/02
                                                        60/287

(Continued)

FOREIGN PATENT DOCUMENTS

DE   102007012790 A1   9/2008
JP   2009-228942 A     10/2009
(Continued)

OTHER PUBLICATIONS

International Search Report dated Sep. 6, 2016 issued in corresponding PCT Application PCT/JP2016/068154 cites the patent documents above.

*Primary Examiner* — Audrey K Bradley
*Assistant Examiner* — Anthony Ayala Delgado
(74) *Attorney, Agent, or Firm* — Norton Rose Fulbright US LLP (57) ABSTRACT

An exhaust gas purification device including: a spray nozzle provided in an exhaust pipe of an engine; a mixer provided downstream of the spray nozzle in a flow direction of exhaust gas; and a catalyst reactor provided downstream of the mixer. The exhaust gas purification device is configured to spray a reducing agent from the urea water spray nozzle to the exhaust gas from the engine, to mix the reducing agent with the exhaust gas in the mixer, and to reduce nitrogen oxides in the exhaust gas using the catalyst reactor. The mixer includes a cylindrical body and a plurality of fins arranged in the cylindrical body radially outward with (Continued)

respect to the axis of the cylindrical body. The upstream portion of each fin is shaped to provide a cutoff portion.

4 Claims, 7 Drawing Sheets

(51) Int. Cl.
  *F01N 3/20* (2006.01)
  *F01N 3/24* (2006.01)
  *F01N 3/28* (2006.01)
(52) U.S. Cl.
  CPC ............... *F01N 3/08* (2013.01); *F01N 3/20* (2013.01); *F01N 3/2066* (2013.01); *F01N 3/24* (2013.01); *F01N 3/2892* (2013.01); *F01N 2240/20* (2013.01); *F01N 2450/22* (2013.01); *F01N 2610/02* (2013.01); *Y02T 10/24* (2013.01)
(58) Field of Classification Search
  CPC .......... F01N 2610/02; F01N 3/08; F01N 3/20; F01N 3/2066; F01N 3/24; F01N 3/2892; Y02T 10/24
  See application file for complete search history.

(56) References Cited

U.S. PATENT DOCUMENTS

| | | |
|---|---|---|
| 2011/0113764 A1 | 5/2011 | Salanta et al. |
| 2016/0032809 A1* | 2/2016 | Kobe ................... B01F 5/0614 60/324 |
| 2016/0194995 A1* | 7/2016 | Weiss ................... F01N 3/2892 60/324 |

FOREIGN PATENT DOCUMENTS

| | | |
|---|---|---|
| JP | 2011-525958 A | 9/2011 |
| JP | 2013-511653 A | 4/2013 |
| JP | 2015-075042 A | 4/2015 |
| WO | 2015/053256 A1 | 4/2015 |

* cited by examiner

EXHAUST GAS PURIFICATION DEVICE

CROSS REFERENCES TO RELATED APPLICATIONS

This application is a national stage application pursuant to 35 U.S.C. § 371 of International Application No. PCT/JP2016/068154, filed on Jun. 17, 2016, which claims priority under 35 U.S.C. § 119 to Japanese Patent Application No. 2015-195401, filed on Sep. 30, 2015, the disclosures of which are hereby incorporated by reference in their entireties.

TECHNICAL FIELD

The present invention relates to an exhaust gas purification device for an engine. In particular, the present invention relates to an exhaust gas purification device including a mixer configured to mix exhaust gas from the engine with a sprayed reducing agent.

BACKGROUND ART

Conventionally, in order to reduce nitrogen oxides (NOx) contained in exhaust gas from a marine engine, there are known exhaust gas purification devices configured to reduce NOx into nitrogen and water using a selective catalytic reduction NOx catalyst (SCR catalyst) and a reducing agent. For example, some of such devices are configured to generate ammonia from urea water sprayed into high-temperature exhaust gas and to reduce NOx into nitrogen and water on the NOx catalyst.

In regard to these exhaust gas purification devices, there has been known a device provided with a mixer configured to mix the exhaust gas with the reducing agent in order to enhance the efficiency of the reduction process on the NOx catalyst (for example, see Patent Literature 1 (PTL1)). In this exhaust gas purification device, the exhaust gas forcedly mixed with the reducing agent by the mixer is supplied to the NOx catalyst, thereby to enhance the efficiency of the reduction process of the exhaust gas.

CITATION LIST

Patent Literature

PTL1: Japanese Patent Application Laid-Open No. 2015-75042

SUMMARY OF INVENTION

Technical Problem

Now, urea may precipitate out from the urea water sprayed into the high-temperature exhaust gas due to a temperature decrease in the mixer, and may be attached inside the mixer, disadvantageously. In a mixer described in PTL1, for example, precipitated urea tends to be attached to: upstream portions of plate-like members functioning as fins (upstream portions in a flow direction of exhaust gas); bent portions of the plate-like members; and an upstream portion of a core member in the flow direction of the exhaust gas.

The present invention has been made to solve problems such as above. An object of the invention is to provide an exhaust gas purification device configured so that a precipitated reducing agent is less likely to be attached to a mixer.

Solution to Problem

An exhaust gas purification device in an aspect of the present invention includes: a spray nozzle provided in an exhaust pipe of an engine; a mixer provided downstream of the spray nozzle in a flow direction of exhaust gas; and a catalyst reactor provided downstream of the mixer, the exhaust gas purification device being configured to spray a reducing agent from the spray nozzle to the exhaust gas from the engine, to mix the reducing agent with the exhaust gas in the mixer, and to reduce one or more nitrogen oxides in the exhaust gas using a catalyst contained in the catalyst reactor. The mixer includes a cylindrical body and a plurality of fins arranged in the cylindrical body radially outward with respect to an axis of the cylindrical body; and an upstream portion of each fin that is at its upstream side in the flow direction of the exhaust gas is shaped to provide a cutoff portion formed by cutting the fin from an upstream side end portion of the fin toward the axis and toward a downstream side of the fin.

In the exhaust gas purification device in the above aspect of the invention, it is preferable that when the mixer is viewed from its upstream side, the cutoff portion of each fin is positioned so as to overlap its adjacent fin out of the plurality of fins.

The exhaust gas purification device in the above aspect of the invention preferably includes a support member welded to downstream-facing surfaces of the fins and configured to support the fins.

In the exhaust gas purification device in the above aspect of the invention, it is preferable that the support member is formed by one or more shaped steel members each having a V cross-sectional shape or a circular cross-sectional shape.

In the exhaust gas purification device in the above aspect of the invention, it is preferable that the support member includes: the shaped steel members, the number of which is two or more and which cross each other at an intersection portion positioned at the axis of the cylindrical body; and a reinforcing plate welded to the intersection portion.

Advantageous Effects of Invention

According to an embodiment of the present invention, the exhaust gas purification device is arranged to provide the cutoff portions to the fins. This makes a distance from the spray nozzle to the fins longer, and eliminates an axis-close part of the upstream portion of each fin, on which the sprayed reducing agent is most likely to hit. This makes it less likely that the reducing agent is cooled, and therefore the reducing agent is less likely to precipitate out. As a result, precipitated reducing agent is less likely to be attached to the upstream portions of the fins.

According to an embodiment of the present invention, the exhaust gas purification device is arranged so that the cutoff portion of each fin is positioned so as to overlap its adjacent fin when viewed from the upstream side, and therefore the cutoff portions do not affect generation of a swirling flow by the fins.

According to an embodiment of the present invention, the exhaust gas purification device is arranged to include the support member welded to the downstream-facing surfaces of the fins, and therefore the fins can be supported without interfering with the flow of the exhaust gas. Furthermore, the use of the support member makes it possible to fix the fins without providing a shaft-like core member at the axis. If such a core member is provided, the reducing agent is cooled at an upstream portion of the core member, and this makes it more likely that the reducing agent precipitates out. In this regard, however, no core member is provided, and therefore the reducing agent is less likely to be cooled at or around an axis of the fins and the reducing agent is less likely to precipitate out.

According to an embodiment of the present invention, the exhaust gas purification device is arranged so that the support member is formed by one or more shaped steel members each having a V cross-sectional shape. This makes a contact area between the support member and the fins larger, and therefore the fins can be firmly welded. Alternatively, the support member may be formed by one or more shaped steel members each having a circular cross-sectional shape. In this case, commercially available pipes can be used as the shaped steel members, and the support member can be produced at low cost.

According to an embodiment of the present invention, the exhaust gas purification device is arranged so that the reinforcing plate is welded to the intersection portion of the support member, and this reinforces the intersection portion.

DESCRIPTION OF EMBODIMENTS

In this Description, an "upstream side" indicates an upstream side in a flow direction of exhaust gas, whereas a "downstream side" indicates a downstream side in the flow direction of the exhaust gas.

This embodiment deals with, as an example, a case in which an exhaust gas purification device is provided with respect to an engine that is an internal combustion engine (for example, a propulsion engine or an auxiliary engine of marine engines.) However, the application of the device is not limited to this. In cases where a plurality of engines, such as auxiliary engines of marine engines, are provided, a single exhaust gas purification device may be provided so as to purify exhaust gas from these engines collectively, or exhaust gas purification devices may be provided for the respective engines.

Figure 1:
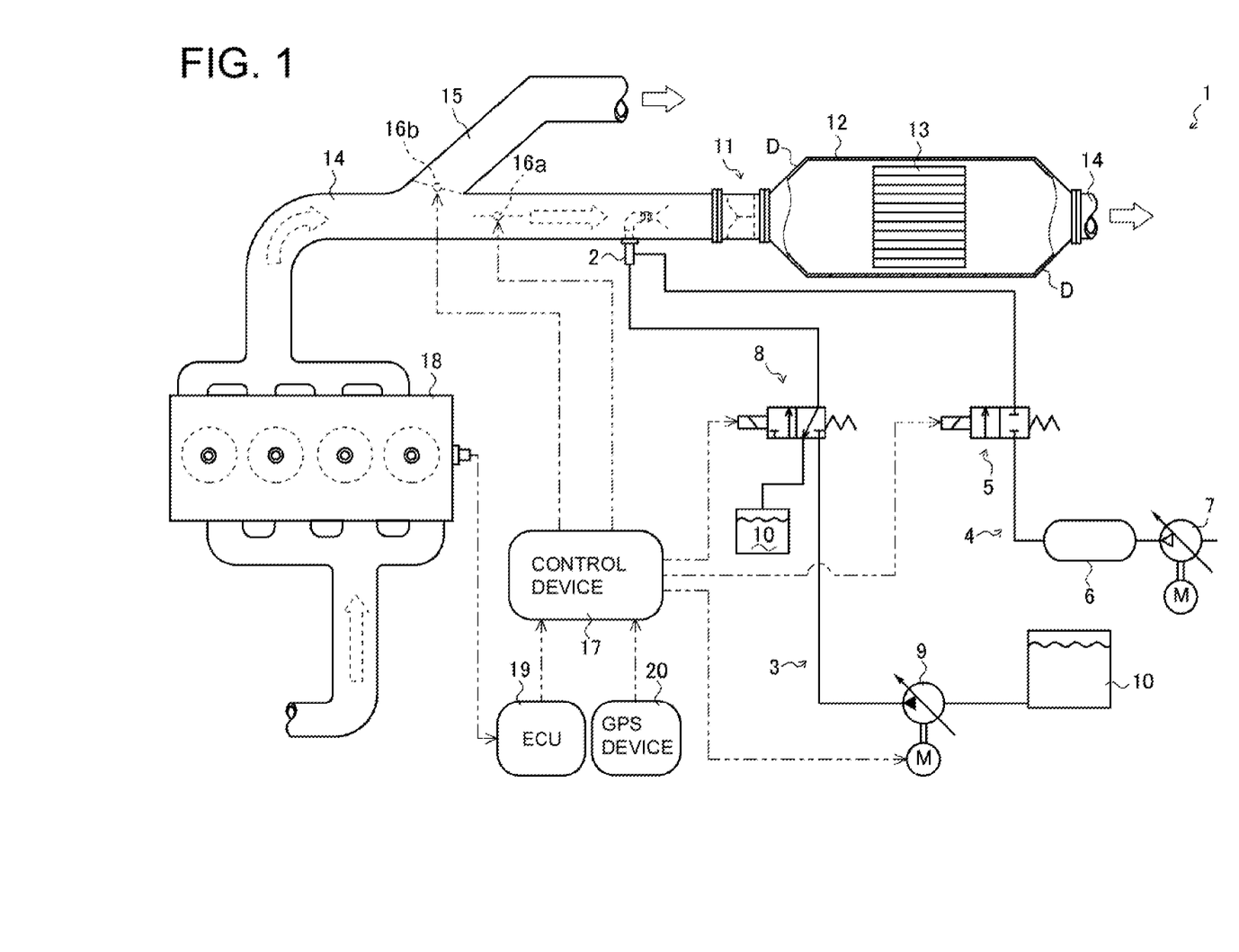
FIG. 1 A diagram illustrating a schematic structure of an exhaust gas purification device of an embodiment.

FIG. 1 is a diagram illustrating a schematic structure of the exhaust gas purification device of this embodiment. An exhaust gas purification device 1 is configured to purify exhaust gas from an engine 18. The exhaust gas purification device 1 includes: an urea water spray nozzle 2; an urea supply passage 3; an air supply passage 4; a pressurized air valve 5; an air tank 6; a pressurized air supply pump (compressor) 7; a changeover valve 8; an urea water supply pump 9; an urea water tank 10; a mixer 11; a catalyst reactor 12; an NOx catalyst 13; and a control device 17. In the exhaust gas purification device 1, urea water is used as a reducing agent; however, the reducing agent is not limited to urea water.

The urea water spray nozzle 2, which is a nozzle for spraying the reducing agent, is configured to supply urea water functioning as the reducing agent into an exhaust pipe 14. The urea water spray nozzle 2 is formed by a tubular member. One end portion of the urea water spray nozzle 2 that has a spray hole is inserted from the outside to the inside of the exhaust pipe 14 connected to the engine 18. The urea supply passage 3, through which urea water flows, is connected to the urea water spray nozzle 2. Furthermore, the air supply passage 4, through which pressurized air flows, is connected to the urea water spray nozzle 2.

The urea water spray nozzle 2 is provided so as to spray urea water from a position at an axis of the exhaust pipe 14 toward a downstream side. The urea water spray nozzle 2 is configured to spray urea water with equal cone angles with respect to its spray hole. That is, the urea water spray nozzle 2 is configured to spray urea water substantially conically from the spray hole as a vertex of the cone.

The pressurized air valve 5 is configured to open or close communication in the passage of pressurized air. The pressurized air valve 5 is provided to the air supply passage 4. The pressurized air valve 5 is formed by a solenoid valve, and its solenoid is connected to the control device 17. The pressurized air valve 5 is configured to be able to supply pressurized air, which has been pressurized by the pressurized air supply pump (compressor) 7 in the air tank 6, to the urea water spray nozzle 2 by sliding a not-illustrated spool.

The changeover valve 8 is configured to change over the passage of urea water. The changeover valve 8 is provided downstream of the urea water supply pump 9 in the urea supply passage 3. The changeover valve 8 is configured to be able to supply urea water in the urea water tank 10 via the urea water supply pump 9 to the urea water spray nozzle 2 by sliding a not-illustrated spool.

The mixer 11 is configured to mix exhaust gas with urea water. The mixer 11 is connected to a portion of the exhaust pipe 14 that is downstream from the urea water spray nozzle 2 by a predetermined distance. The predetermined distance is a distance needed for the urea water sprayed from the urea water spray nozzle 2 to decompose into ammonia in the exhaust pipe 14. The mixer 11 includes: a circular cylindrical body 21 shaped to have an inner diameter equal to that of the exhaust pipe 14; and four plate-like fins 22 provided inside the cylindrical body 21. The mixer 11 is configured so that a swirling flow is imparted by the fins 22 to the exhaust gas passing through the mixer 11 (see FIG. 3). That is, the mixer 11 is configured so that the exhaust gas having passed a central portion of the exhaust pipe 14 flows along an inner wall surface of the mixer 11.

The catalyst reactor 12 is configured to selectively reduce NOx in the exhaust gas by the NOx catalyst 13 provided in the catalyst reactor 12. The catalyst reactor 12 has a substantially rectangular parallelepiped shape having a first open end portion and a second open end portion. The first end portion of the catalyst reactor 12, which is an upstream end portion, has a tapered shape D tapering narrower. The first end portion of the catalyst reactor 12 is connected to the mixer 11. That is, the mixer 11 is provided so as to be in close contact with the first end portion of the catalyst reactor 12. The second end portion of the catalyst reactor 12, which is a downstream end portion, has a tapered shape D tapering narrower. The second end portion of the catalyst reactor 12 is connected to the exhaust pipe 14.

The NOx catalyst 13 is configured to promote the reaction of reducing NOx. The NOx catalyst 13 is provided inside the catalyst reactor 12. The NOx catalyst 13 is configured to promote the reaction in which ammonia, generated from urea water through pyrolysis/hydrolysis, reduces NOx contained in the exhaust gas into nitrogen and water.

Now, a description will be given to the exhaust pipe 14. The exhaust pipe 14 is provided to discharge the exhaust gas from the engine 18 to an outside (atmosphere). The urea water spray nozzle 2, the mixer 11, and the catalyst reactor 12 of the exhaust gas purification device 1 are provided with respect to the exhaust pipe 14. Furthermore, exhaust gas changeover valves 16a and 16b are provided with respect to the exhaust pipe 14. These valves 16a and 16b are provided upstream of the urea water spray nozzle 2, and are configured to change a path of the exhaust gas between the exhaust pipe 14 and a branch pipe 15. That is, the exhaust gas changeover valves 16a and 16b, the urea water spray nozzle 2, and the mixer 11 are provided in this order from an upstream side with respect to the exhaust pipe 14. The branch pipe 15 is connected to the exhaust pipe 14. The exhaust gas changeover valve 16a is provided in a portion of the exhaust pipe 14 that is upstream of the urea water spray nozzle 2 and downstream of the branch pipe 15. The exhaust gas changeover valve 16b is provided in the branch pipe 15.

The exhaust gas changeover valves 16a and 16b are configured to be openable/closable in association with each other. Specifically, the exhaust gas changeover valves 16a and 16b are configured so that: when the exhaust gas changeover valve 16a is open, the exhaust gas changeover valve 16b is closed; and when the exhaust gas changeover valve 16a is closed, the exhaust gas changeover valve 16b is open. Due to this, when the exhaust gas changeover valve 16a is open and the exhaust gas changeover valve 16b is closed, a path for supplying the exhaust gas to the exhaust gas purification device 1 is structured in the exhaust pipe 14. This is shown in FIG. 1. Meanwhile, when the exhaust gas changeover valve 16a is closed and the exhaust gas changeover valve 16b is open, a path for discharging the exhaust gas through the branch pipe 15 to the outside (atmosphere) without purification in the exhaust gas purification device 1 is structured in the exhaust pipe 14. It should be noted that these elements may be provided with respect to the exhaust pipe 14 in the following order: the urea water spray nozzle 2; the exhaust gas changeover valves 16a and 16b; and the mixer 11, from the upstream side. In this alternative arrangement, the exhaust gas changeover valve 16b is controlled so as to be closed when urea water is sprayed.

Alternatively, the following arrangement is also possible as another embodiment: an exhaust gas changeover valve configured to selectively close either one of the exhaust pipe 14 and the branch pipe 15 may be provided at a portion of the exhaust pipe 14 to which the branch pipe 15 is connected. When the branch pipe 15 is closed, a path for supplying the exhaust gas to the exhaust gas purification device 1 is structured in the exhaust pipe 14. Meanwhile, when the exhaust pipe 14 is closed, a path for discharging the exhaust gas through the branch pipe 15 to the outside (atmosphere) without purification in the exhaust gas purification device 1 is structured in the exhaust pipe 14.

The control device 17 is connected to the pressurized air valve 5, the changeover valve 8, the urea water supply pump 9, and the exhaust gas changeover valves 16a and 16b. The control device 17 is configured to control these elements. The control device 17 stores: various programs and data for controlling the pressurized air valve 5, the changeover valve 8, the urea water supply pump 9, and the exhaust gas changeover valves 16a and 16b; and a map of Emission Control Areas. The control device 17 may have a structure in which a central processing unit (CPU), a read-only memory (ROM), a random-access memory (RAM), a hard disk drive (HDD), and the like are connected by a bus, or a structure with a single chip of a large-scale integrated (LSI) circuit and the like. The control device 17 may be structured unitarily with an engine control unit (ECU) 19 configured to control the engine 18.

The control device 17 is connected to the ECU 19, and thus can obtain various types of information related to the engine 18 from the ECU 19. Furthermore, the control device 17 is connected to a Global Positioning System (GPS) device 20, and thus can obtain a position detected by the GPS device 20.

In cases where the exhaust gas purification device 1 structured above is provided in a ship, the control device 17 obtains the current position of the ship detected by the GPS device 20, and determines whether the current position is in the Emission Control Areas based on the map of Emission Control Areas. When determining that the current position is in the Emission Control Areas, the control device 17 controls the exhaust gas changeover valve 16a so as to be open and controls the exhaust gas changeover valve 16b so as to be closed. That is, the exhaust gas is discharged to the outside after being purified by the exhaust gas purification device 1.

Meanwhile, when determining that the current position is not in the Emission Control Areas, the control device 17 controls the exhaust gas changeover valve 16a so as to be closed and controls the exhaust gas changeover valve 16b so as to be open. That is, the exhaust gas is discharged to the outside through the branch pipe 15 without being purified by the exhaust gas purification device 1. The control device 17 is capable of controlling the exhaust gas changeover valves 16a and 16b based on opening/closing signals for opening/closing the exhaust gas changeover valves 16a and 16b input manually and received by the control device 17.

Figure 2:
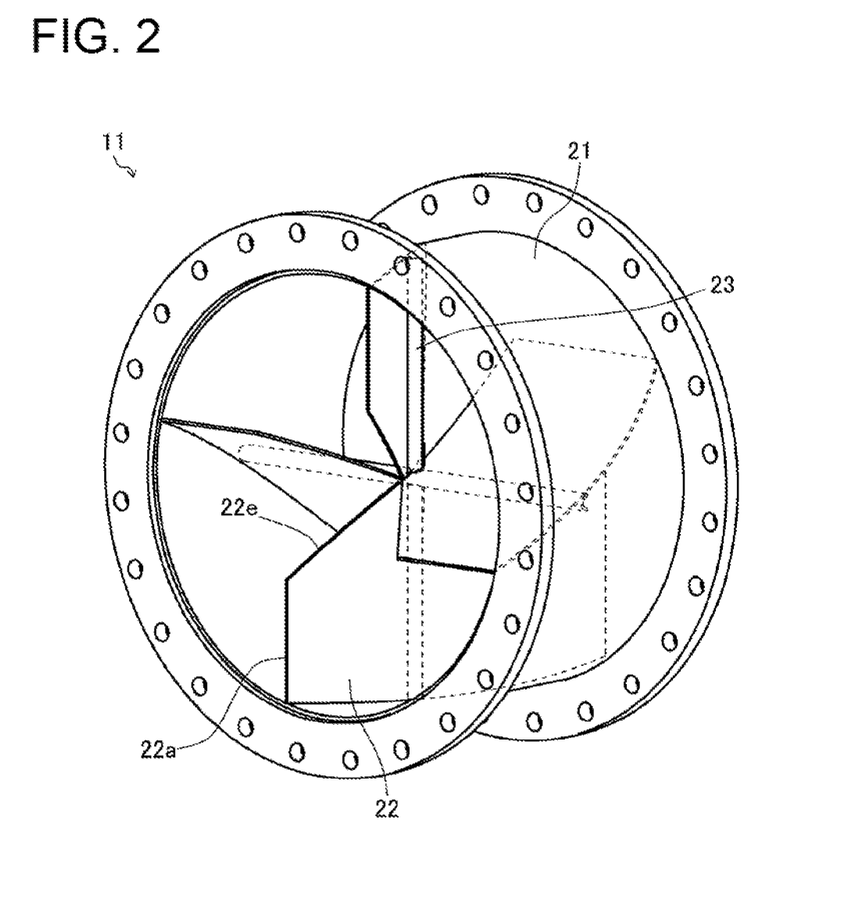
FIG. 2 A perspective view of an upstream portion of a mixer of the embodiment.
Figure 3:
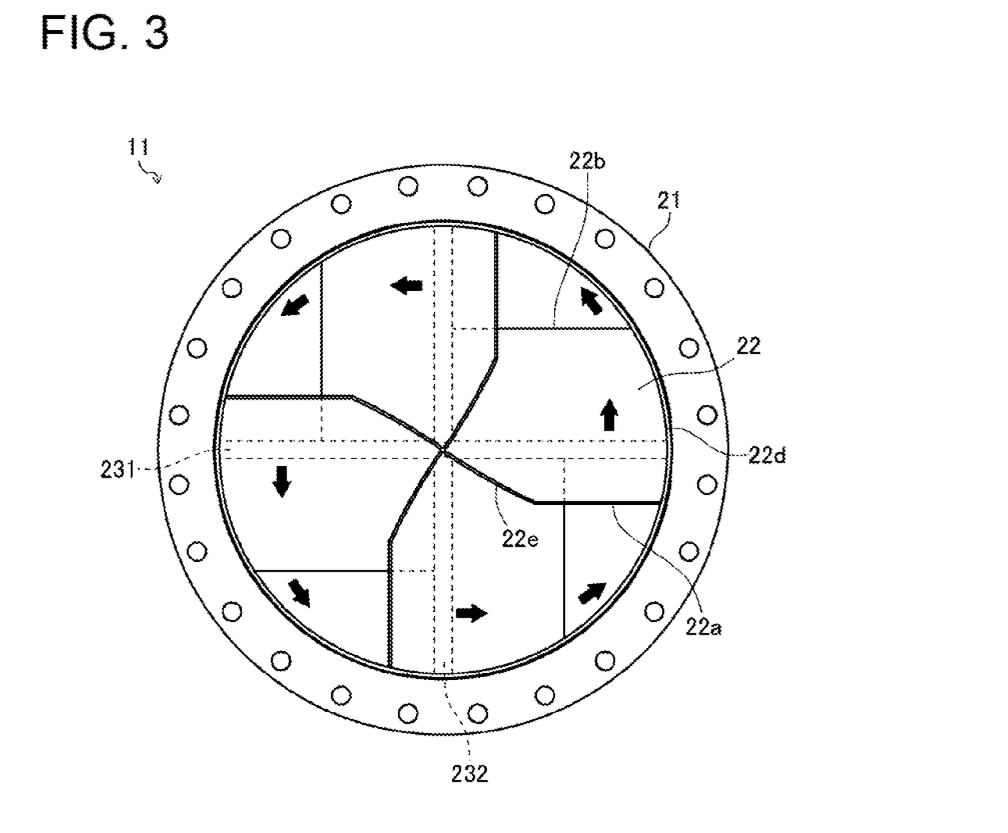
FIG. 3 A front view of the mixer of the embodiment, viewed from its upstream side.
Figure 4:
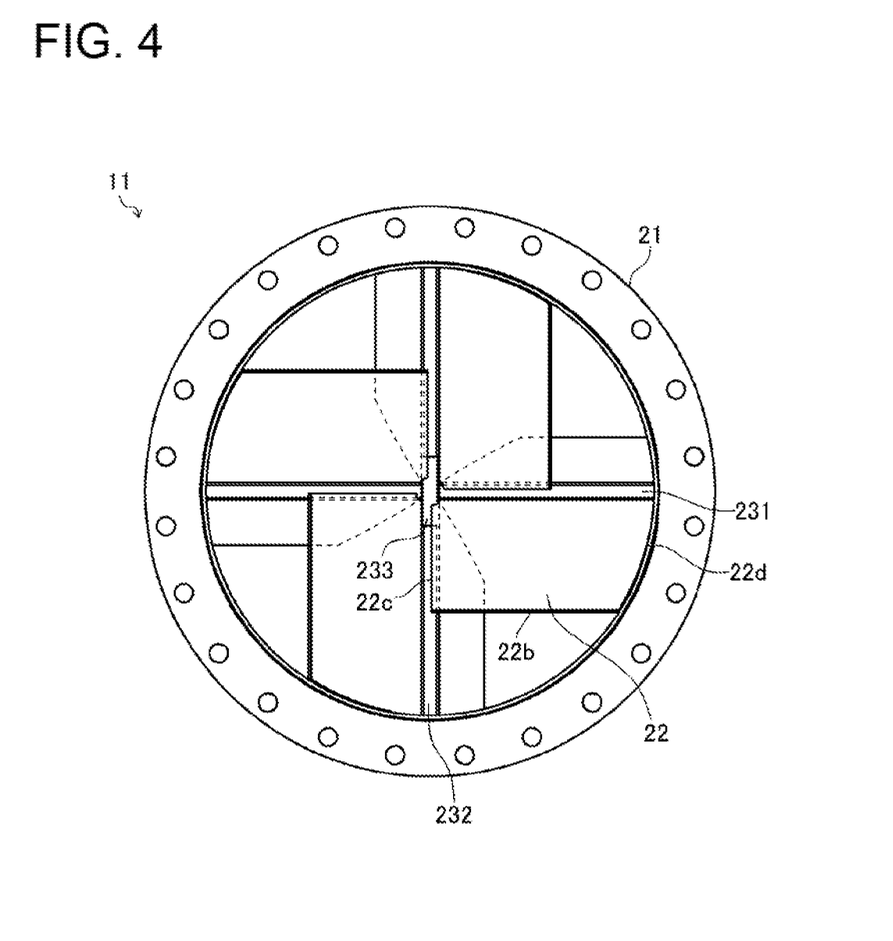
FIG. 4 A rear view of the mixer of the embodiment, viewed from its downstream side.
Figure 5:
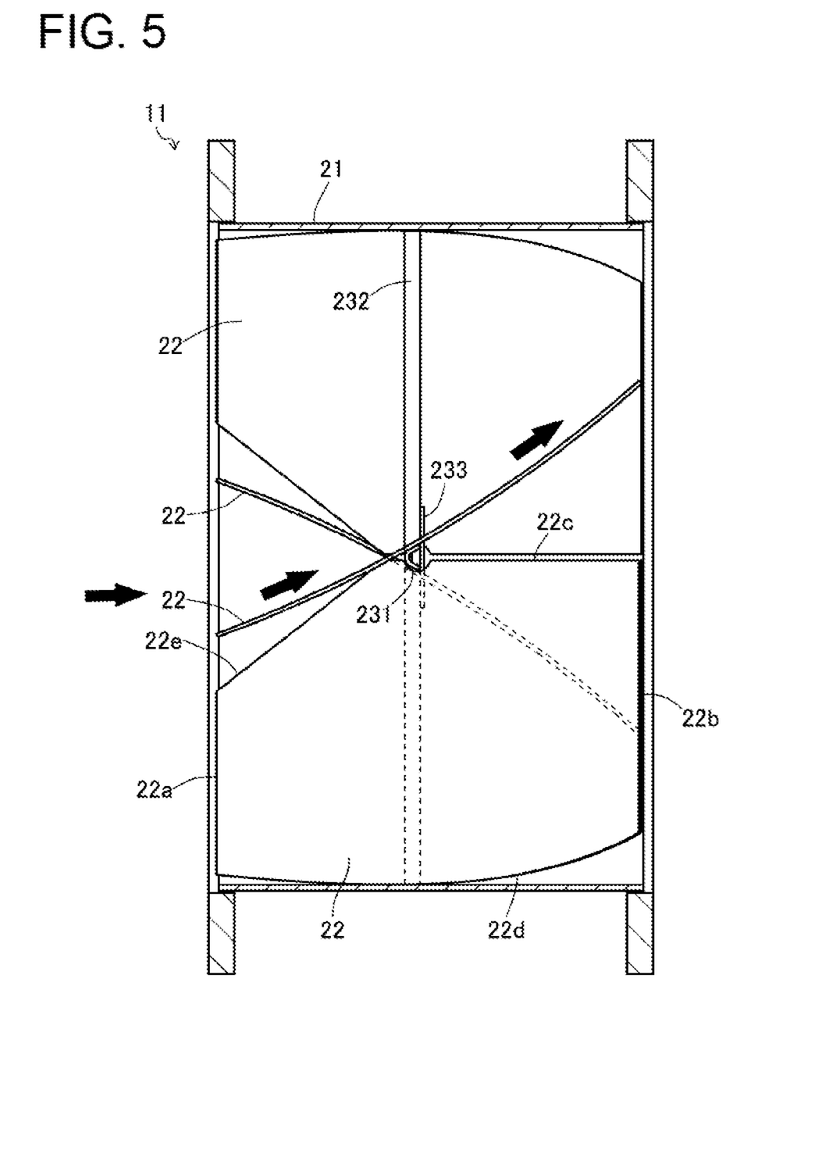
FIG. 5 A partial cross sectional side view of the mixer of the embodiment.
Figure 6:
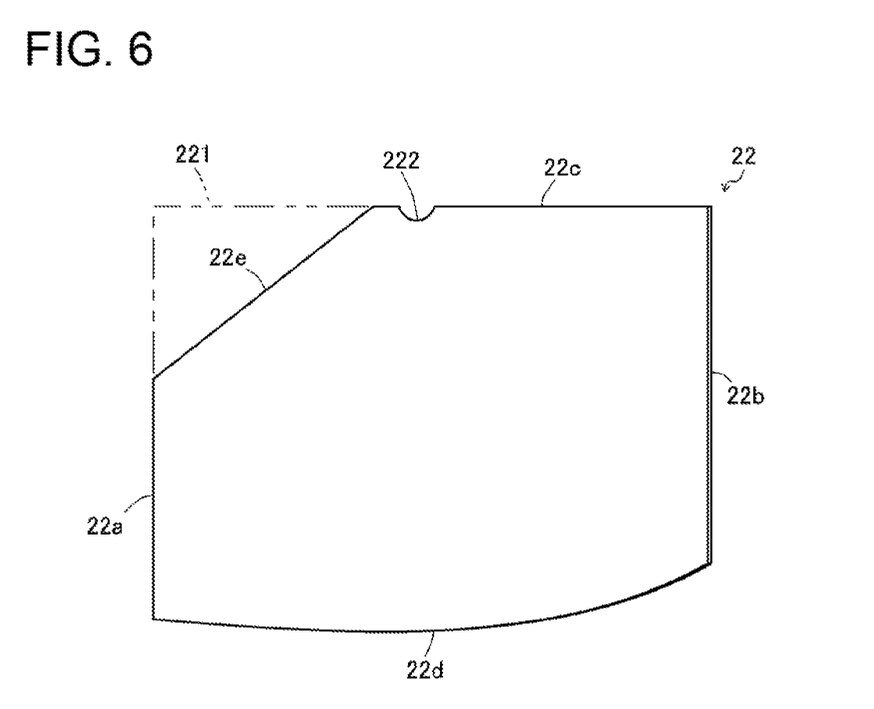
FIG. 6 A side view of a fin of the embodiment.
Figure 7A:
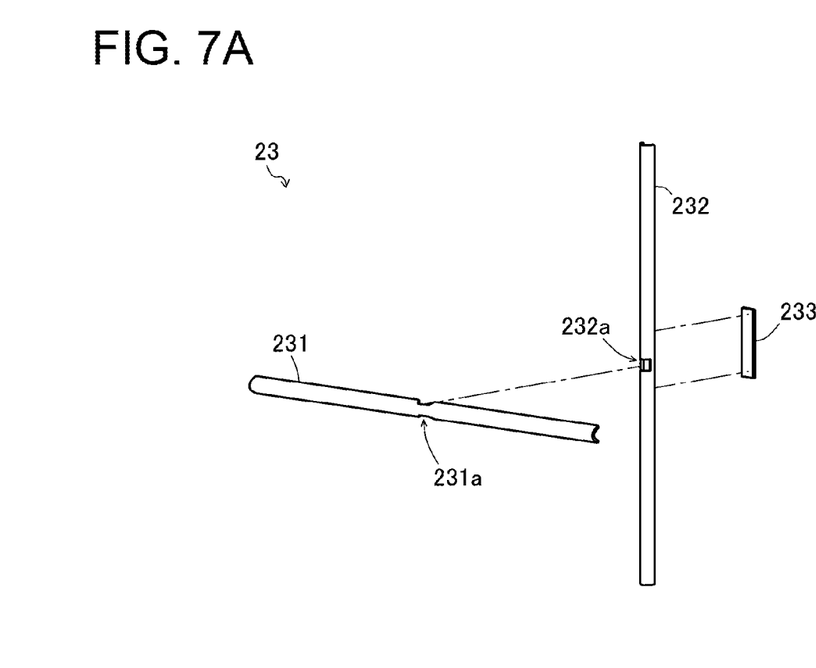
FIG. 7A is an upstream-side exploded perspective view of a support member of the embodiment.
Figure 7B:
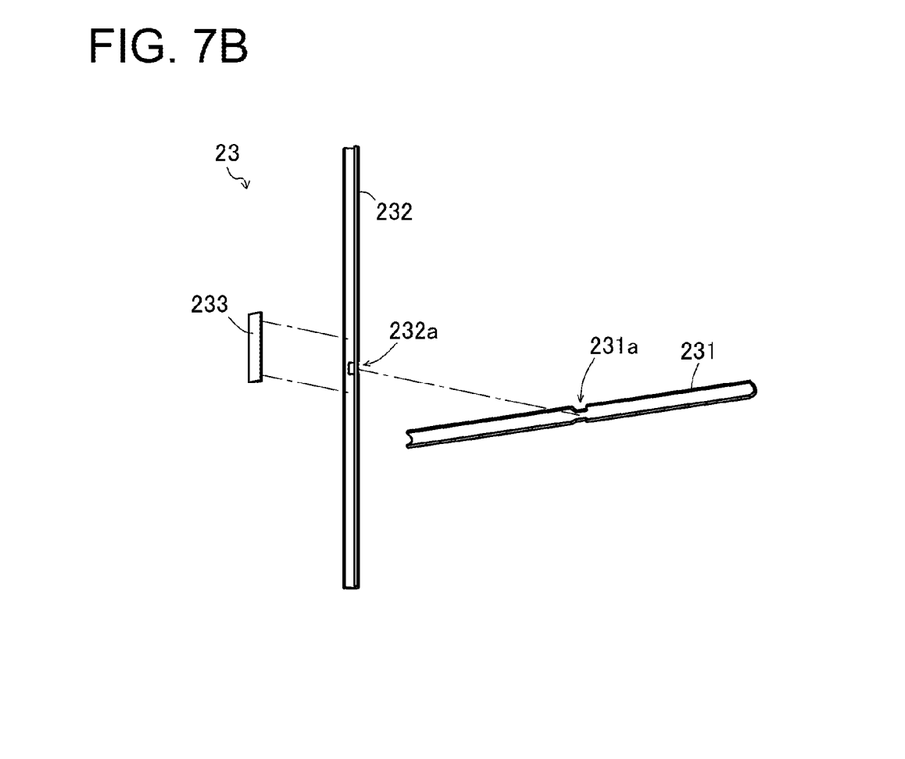
FIG. 7B is a downstream-side exploded perspective view of the support member of the embodiment.

The following specifically describes the structure of the mixer 11. FIG. 2 is a perspective view of an upstream portion of the mixer 11; FIG. 3 is a front view of the mixer 11, viewed from its upstream side; FIG. 4 is a rear view of the mixer 11, viewed from its downstream side; and FIG. 5 is a partial cross sectional side view of the mixer 11. FIG. 6 is a side view of a fin; FIG. 7A is an upstream-side exploded perspective view of a support member; and FIG. 7B is a downstream-side exploded perspective view of the support member.

As shown in FIG. 2 to FIG. 5, the mixer 11 includes the cylindrical body 21, the four fins 22, and a support member 23. The mixer 11 is made of steel material, for example.

The cylindrical body 21 is mainly formed by a circular cylindrical member having an inner diameter substantially equal to that of the exhaust pipe 14. An upstream portion of the cylindrical body 21 is connected to the exhaust pipe 14 so that an axis of the upstream portion matches with the axis of the exhaust pipe 14, and a downstream portion of the cylindrical body 21 is connected to the first end portion of the catalyst reactor 12. That is, the cylindrical body 21 is connected to the exhaust pipe 14 to form an exhaust passage.

The fins 22 are configured to impart swirl to the flow of the exhaust gas. The four fins 22 have the same shape. Each fin 22 has a shape such that a portion of a substantially rectangular plate-like member is cut off. Specifically, as shown in FIG. 6, each fin 22 has: an upstream side end portion 22a which is substantially orthogonal to a direction of an axis of the cylindrical body 21 and is positioned at an upstream side of the fin 22; a downstream side end portion 22b which is substantially parallel to the upstream side end portion 22a and is positioned at a downstream side of the fin 22; an axis side end portion 22c positioned close to the axis of the cylindrical body 21; a cylindrical body side end portion 22d which is substantially parallel to the axis side end portion 22c and is in contact with an inner surface of the cylindrical body 21; and a cutoff side end portion 22e which connects the upstream side end portion 22a and the axis side end portion 22c obliquely.

A space created by the cutoff side end portion 22e at an upstream portion of the fin 22, i.e., a space defined by an extension of the upstream side end portion 22a, an extension of the axis side end portion 22c, and the cutoff side end portion 22e, can be referred to as a cutoff portion 221 formed by cutting the fin 22 from the upstream side end portion 22a of the fin 22 toward the axis of the cylindrical body 21 and toward the downstream side of the fin 22. Furthermore, a portion of the axis side end portion 22c through which the support member 23 passes is cut off to create a semicircular support-member-purpose cutoff portion 222. As shown in FIG. 4, each fin 22 is curved, for example, in an arc manner, from the upstream side end portion 22a toward the downstream side end portion 22b. That is, each fin 22 is curved relative to the flow direction of the exhaust gas.

Thus, because the fins 22 are curved, the exhaust gas flows smoothly along the fins 22 as compared with cases where fins are bent. This makes it less likely that a puddle of urea water is created and that urea precipitates out.

As shown in FIG. 2 to FIG. 5, the fins 22 are arranged in the cylindrical body 21 radially outward with respect to the axis of the cylindrical body 21. More specifically, the cylindrical body side end portion 22d of each of the four fins 22 is fixed to the inner surface of the cylindrical body 21 so that the axis side end portion 22c is directed to the axis of the cylindrical body 21. The four fins 22 are arranged at equal angular intervals (at intervals of 90 degrees in this embodiment).

Each cylindrical body side end portion 22d is fixed to the inner surface of the cylindrical body 21 by welding. As for parts to be welded, the whole of the cylindrical body side end portion 22d may be welded; however, in this case, it takes time for welding, and welding distortion and/or residual stress is/are more likely to occur. In view of the above, only an upstream half portion of the cylindrical body side end portion 22d may be welded, for example. In addition to this, a downstream half portion may be welded in an intermittent manner. This leads to reduction of welding time and prevention of the welding distortion and residual stress. The prevention of the welding distortion and residual stress leads to prevention of cracking at the welded parts.

As shown in FIG. 3, when the mixer 11 is viewed from its upstream side, the cutoff portion 221 of each fin 22 is positioned so as to overlap its adjacent fin 22, and therefore the creation of each cutoff portion 221 does not affect the generation of the swirling flow. Rather, the provision of the cutoff portions 221 makes the distance from the urea water spray nozzle 2 to the fins 22 longer, and eliminates an axis-close part of the upstream portion of each fin 22, on which the sprayed urea water is most likely to hit. This makes it less likely that the urea water is cooled, and therefore urea is less likely to precipitate out. As a result, precipitated urea is less likely to be attached to the upstream portions of the fins 22.

To ensure the above functions and effects provided by the cutoff portions 221, it is desirable to design the size of each cutoff portion 221 so that when the mixer 11 is viewed from its upstream side, an area of a portion of each fin 22 that overlaps its adjacent fin 22 and cannot be seen is on the order of 5% to 30% of a projected area of the fin 22 projected toward the downstream side.

While in the present embodiment, the number of fins 22 is four, the number of fins 22 is not limited to four as long as two or more.

As shown in FIG. 2 to FIG. 5, the support member 23 is configured to fix and support the four fins 22. It can be also said that the support member 23 is fixed and supported by the four fins 22. The support member 23 is, for example, a shaped steel member assembled into a cross shape. The support member 23 is welded to downstream-facing surfaces of the fins 22. Due to this, the support member 23 does not interfere with the flow of the exhaust gas flowing along upstream-facing surfaces of the fins 22. Furthermore, due to the use of the support member 23, the fins 22 can be fixed without using a shaft-like core member at the axis of the cylindrical body 21. If such a core member is provided, the urea water is cooled at an upstream portion of the core member, and this makes it more likely that urea precipitates out. In this regard, however, no core member is provided, and therefore urea is less likely to be attached at or around an axis of the fins 22.

As shown in FIG. 7A and FIG. 7B the support member 23 includes: first and second shaped steel members 231 and 232; and a reinforcing plate 233.

The first shaped steel member 231 is a shaped steel member having a "V" cross-sectional shape. The first shaped steel member 231 has a length substantially equal to the inner diameter of the cylindrical body 21. The first shaped steel member 231 has an intersection portion 231a at its central portion matching with the axis of the cylindrical body 21. At the intersection portion 231a, the first shaped steel member 231 and the second shaped steel member 232 are fitted to each other so as to cross each other. The intersection portion 231a is formed by notching both end portions of the first shaped steel member 231 in its width direction.

The second shaped steel member 232 is a shaped steel member similar to the first shaped steel member 231, and has the same length as that of the first shaped steel member 231. The second shaped steel member 232 has an intersection portion 232a at its central portion matching with the axis of the cylindrical body 21. At the intersection portion 232a, the first shaped steel member 231 and the second shaped steel member 232 are fitted to each other so as to cross each other. The intersection portion 232a is formed by notching a bent portion of the second shaped steel member 232 that is at a center in the width direction of the second shaped steel member 232.

The reinforcing plate 233 is a plate-like steel member having a rectangular shape when viewed from the front. The reinforcing plate 233 may be made of material same as that of the first and second shaped steel members 231 and 232. The length of the reinforcing plate 233 in its width direction is equal to the length of the second shaped steel member 232 in its width direction. The length of the reinforcing plate 233 in its longitudinal direction is designed so as to ensure a strength to sufficiently withstand a load exerted to the intersection portions 231a and 232a by welding. The intersection portions 231a and 232a are reinforced by the reinforcing plate 233.

The support member 23 is produced in the following manner: the first shaped steel member 231 and the second shaped steel member 232 are fitted to each other so as to cross each other at their intersection portions 231a and 232a and welded together; and the reinforcing plate 233 is welded to a downstream side surface of the intersection portion 232a of the second shaped steel member 232.

The support member 23 and the fins 22 are joined together by welding upstream-facing surfaces of the first and second shaped steel members 231 and 232 to the downstream-facing surfaces of the fins 22. Now, the first and second shaped steel members 231 and 232 are welded to the fins 22 in an intermittent manner across their lengths in their respective longitudinal directions. This leads to reduction of welding time and prevention of welding distortion and residual stress.

The support member 23 is welded to the fins 22 at parts other than the intersection portions 231a and 232a of the support member 23. That is, the support-member-purpose cutoff portions 222 and portions around them are not welded. This is because, if the support member 23 is welded to the fins 22 at the intersection portions 231a and 232a, welded parts are close to each other, which tends to cause welding distortion. Accordingly, by welding the support member 23 to the fins 22 at parts other than the intersection portions 231a and 232a, welding distortion at and around the intersection portions 231a and 232a can be prevented.

Furthermore, as shown in FIG. 5, in order to enhance the strength of welding between the first and second shaped steel members 231 and 232 and the fins 22, it is preferable that a contact area between the downstream-facing surface of each fin 22 and the corresponding upstream-facing surface of the first or second shaped steel member 231, 232 is large. Because of this, it is desirable that the interior angle of the V-shape of the first and second shaped steel members 231 and 232 is designed so as to correspond to the angle of a contact portion of each fin 22.

The first and second shaped steel members 231 and 232 and the reinforcing plate 233 can be produced at low cost by using material remaining after the fins 22 are produced. Based on the number and arrangement manner of the fins 22, the number and arrangement manner of shaped steel members functioning as the support member 23 are determined. The cross-sectional shape of the first and second shaped steel members 231 and 232 is not particularly limited. Various cross-sectional shapes such as a circular shape, an elliptical shape, and a polygonal shape are possible as long as such a shape allows the shaped steel members to have a strength to support the fins 22.

The following specifically describes how urea water sprayed from the urea water spray nozzle 2 is mixed in the mixer 11 and the catalyst reactor 12.

The urea water spray nozzle 2 is provided so that a center of the spray hole matches with the axis of the exhaust pipe 14. Urea water, turned into the form of mist by pressurized air, is sprayed from the urea water spray nozzle 2 into the exhaust pipe 14 in a conical manner. The urea water spray nozzle 2 distributes the urea water all over a flow area of the exhaust gas in a plane orthogonal to the flow direction of the exhaust gas in the exhaust pipe 14.

The exhaust gas to which the mist of urea water has been sprayed is guided to the mixer 11 through the exhaust pipe 14. As shown in FIG. 3, the mixer 11 guides, by the fins 22, the exhaust gas so as to flow along the curved shapes of the fins 22. Due to this, the exhaust gas flows toward the inner surface of the cylindrical body 21 of the mixer 11, and moves in a circumferential direction of the inner surface of the cylindrical body 21. As a result, a swirling flow of the exhaust gas is generated, and therefore the exhaust gas is mixed with the urea water (see black solid arrows in FIG. 3).

In this process, because each fin 22 has a curved shape, the exhaust gas flows smoothly along the fins 22. This makes it less likely that a puddle of urea water is created. In addition, due to the provision of the cutoff portions 221, there is a vacant space at and around the axis of the fins 22, where the sprayed urea water is most likely to hit. This allows the urea water to be cooled uniformly, and makes it less likely that a puddle of urea water is created. Thus, because a puddle of urea water is less likely to be created on the fins 22, urea is less likely to precipitate out.

The exhaust gas having passed through the mixer 11 is, in the form of the swirling flow, supplied to the catalyst reactor 12 connected to the mixer 11. In the catalyst reactor 12, the diameter of the swirl of the swirling flow of the exhaust gas is increased by the tapered shape D at the first end portion of the catalyst reactor 12. Due to this, the exhaust gas is distributed to the NOx catalyst 13 provided in the catalyst reactor 12 while being uniformly mixed with the urea water. Accordingly, there is no need to provide a space between the mixer 11 and the catalyst reactor 12 to ensure mixing time for mixing the exhaust gas with the urea water.

INDUSTRIAL APPLICABILITY

The present invention is applicable to an exhaust gas purification device.

REFERENCE SIGNS LIST 1 exhaust gas purification device
2 urea water spray nozzle
11 mixer
12 catalyst reactor
13 NOx catalyst
14 exhaust pipe
18 engine
21 cylindrical body
22 fin
22a upstream side end portion
221 cutoff portion
23 support member
231 first shaped steel member
232 second shaped steel member
232a intersection portion
233 reinforcing plate

The invention claimed is:

1. An exhaust gas purification device comprising:
   a spray nozzle provided in an exhaust pipe of an engine;
   a mixer provided downstream of the spray nozzle in a flow direction of exhaust gas; and
   a catalyst reactor provided downstream of the mixer,
   the exhaust gas purification device being configured to spray a reducing agent from the spray nozzle to the exhaust gas from the engine, to mix the reducing agent with the exhaust gas in the mixer, and to reduce one or more nitrogen oxides in the exhaust gas using a catalyst contained in the catalyst reactor, wherein:
   the mixer includes a cylindrical body, a plurality of fins arranged in the cylindrical body radially outward with respect to an axis of the cylindrical body, and a support member welded to downstream-facing surfaces of the fins and configured to support the fins; and
   an upstream portion of each fin that is at its upstream side in the flow direction of the exhaust gas is shaped to provide a cutoff portion formed by cutting the fin from an upstream side end portion of the fin toward the axis and toward a downstream side of the fin.

2. The exhaust gas purification device according to claim 1, wherein, when the mixer is viewed from its upstream side, the cutoff portion of each fin is positioned so as to overlap its adjacent fin out of the plurality of fins.

3. The exhaust gas purification device according to claim 1, wherein
the support member is formed by one or more shaped steel members each having a V cross-sectional shape or a circular cross-sectional shape.

4. The exhaust gas purification device according to claim 3, wherein the support member includes:
the one or more shaped steel members, the number of which is two or more and which cross each other at an intersection portion positioned at the axis of the cylindrical body; and
a reinforcing plate welded to the intersection portion.

* * * * *